United States Patent [19]

Slez et al.

[11] Patent Number: 4,966,326

[45] Date of Patent: Oct. 30, 1990

[54] AIR-BLASTING CARTRIDGE

[75] Inventors: Leonid G. Slez, Makeeva; Jury I. Tjurin, Zhdanov, both of U.S.S.R.

[73] Assignee: Makeevsky Inzhenrno-Stroitelny Institut, Makeevke, U.S.S.R.

[21] Appl. No.: 328,588

[22] PCT Filed: Oct. 21, 1987

[86] PCT No.: PCT/SU87/00116

§ 371 Date: Feb. 22, 1989

§ 102(e) Date: Feb. 22, 1989

[87] PCT Pub. No.: WO88/10159

PCT Pub. Date: Dec. 29, 1988

[30] Foreign Application Priority Data

Jun. 23, 1987 [SU] U.S.S.R. .............................. 4263106

[51] Int. Cl.⁵ .................................................. G05B 1/08

[52] U.S. Cl. ............................. 239/99; 239/DIG. 13; 239/570; 137/624.14; 137/906

[58] Field of Search ................. 239/99, 570, 558, 560, 239/DIG. 13; 134/155 C, 169 C; 137/469, 624.14, 906

[56] References Cited

U.S. PATENT DOCUMENTS

| | | | |
|---|---|---|---|
| 3,536,263 | 10/1970 | Parker | 239/550 |
| 3,618,857 | 11/1971 | Rautenbach | 239/570 X |
| 3,814,330 | 6/1974 | Masters | 239/558 |

FOREIGN PATENT DOCUMENTS

| | | | |
|---|---|---|---|
| 130454 | 10/1959 | U.S.S.R. . | |
| 1119633 | 10/1984 | U.S.S.R. | 239/99 |

*Primary Examiner*—Andres Kashnikow
*Assistant Examiner*—Kevin P. Weldon
*Attorney, Agent, or Firm*—Fleit, Jacobson, Cohn, Price, Holman & Stern

[57] ABSTRACT

An air-blasting cartridge comrises a housing (1) subdivided into an inlet chamber (3) and a discharge chamber (4) by a piston (2) arranged along its longitudinal axis. The inlet chamber (3) communicates with a source of compressed air through an air admission tube (6) which runs through an axial port of the piston (2). The discharge chamber (4) communicates with the inlet chamber (3) through an annular gap (7) between the air admission tube (6) and the piston (2). The discharge chamber (4) is adapted to communicate with the surrounding atmosphere at the instant of its discharge. The area of the piston end surface (10) facing the discharge chamber (4) is greater than the area of the piston end surface (11) facing the inlet chamber (3) but is smaller than the area of the end surface (12) of the collar (8) on the piston (2) that faces the discharge chamber (4), said collar forming, together with the housing (1), an additional chamber (9) on the side facing the inlet chamber (3).

4 Claims, 1 Drawing Sheet

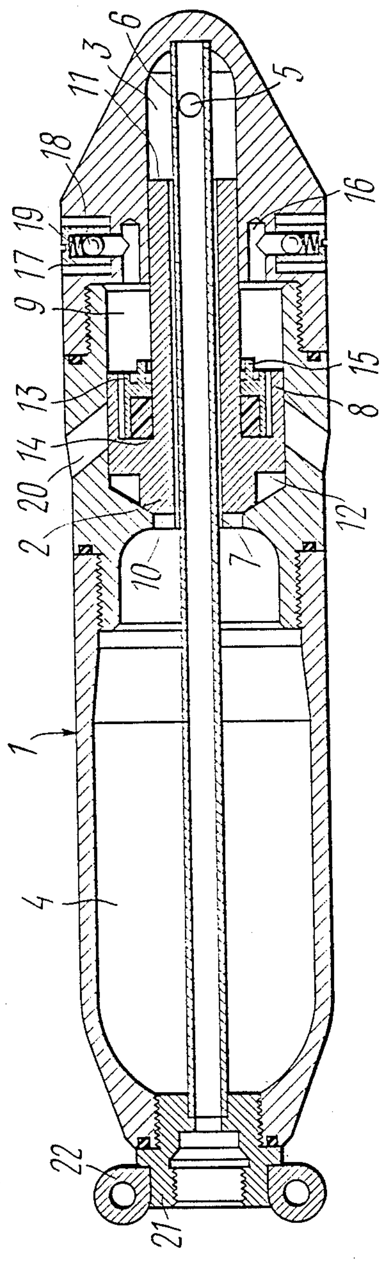
6
3
11
5
18
16
19
17
9
15
13
8
14
20
12
2
10
7
1
4
22
21

AIR-BLASTING CARTRIDGE

TECHNICAL FIELD

The present invention relates generally to water supply and water disposal practice and more specifically to air-blasting cartridges.

One prior-art air-blasting cartridge (SU, A, 130, 454) is known to comprise a housing subdivided into an inlet chamber and a discharge chamber by a piston arranged along the longitudinal axis of the housing. The inlet chamber communicates with a source of compressed air through an air admission tube which passes through an axial port in the piston. The discharge chamber communicates with the inlet chamber through an annular gap left in between the air admission tube and the piston. In addition, the discharge chamber gets connected with the surrounding atmosphere at the instant when it is being discharged.

Compressed air from its source is fed along the air admission tube to the inlet chamber to establish a pressure applied to the piston end adjacent to said chamber, thus forcing the piston against the seat. Compressed air is free to flow to the discharge chamber through the annular gap between the air admission tube and the piston. To actuate the known air-blasting chamber a valve is provided through which an air duct communicating with the air admission pipe can be connected to the atmosphere.

Once the operator has established communicaton between the air duct and the atmosphere, compressed air is free to escape from the air duct, air admission tube and inlet chamber into the atmosphere. As a result, pressure in the inlet chamber falls and the piston is urged, by virtue of the pressure exerted on the hand surface on the part of the discharge chamber, to move towards the inlet chamber, thus opening through-ports in the housing of the air-blasting cartridge for compressed air to release into the atmosphere.

The heretofore-known air-blasting cartridge discussed above is designed for destructing hard coal but is inapplicable for cleaning industrial pipelines or vessels containers from consolidated settlings or cake due to the following reasons:

provision of a valve (discharge head) makes it impossible to maintain automatically a preset operating mode of the air-blasting cartridge within a prolonged period of time;

the valve (discharge head) designed for a high pressure, is in fact a complicated contrivance incapable of providing the necessary reliability of the air-blasting cartridge within a prolonged continuous operating period (that is, it suffices to carry out rock or coal breakdown by air blasting only once;

considerable length of the air duct running from the air-blasting cartridge to the valve-attending operator causes considerable loss of compressed air escaping into the atmosphere and affects adversely the piston traversing speed in the air-blasting cartridge due to a comparatively slow pressure drop in the inlet chamber, which is in turn owing to a great total amount of compressed air in the air duct, air admission tub and inlet chamber, thus reducing much the air-blast power.

SUMMARY OF THE INVENTION

The main object of the present invention is to provide a cartridge having such a construction of a piston that would provide automatic maintaining of preset operating conditions and possibility of adjusting operating conditions without interrupting the operation of the air-blasting cartridge, a possibility of the air-blasting cartridge operation in liquid media supersaturated with solid suspensions, operating reliability and simple construction and also considerable reduction of power consumption of the air-blasting cartridge.

This object is accomplished due to the fact in an air-blasting cartridge, comprising a housing subdivided, by virtue of a piston arranged lengthwise a longitudinal axis thereof, into an inlet chamber communicating with a source of compressed air through an air admission tube which runs through an axial port of the piston, and a discharge chamber communicating with the inlet chamber through an annular gap between the air admission tube and the piston and adapted to communicate with the surrounding atmosphere at the instant of its discharge, according to the invention, the area of the piston end surface facing the discharge chamber exceeds the area of its end surface facing the inlet chamber but is smaller than the area of the end surface of a piston collar facing the discharge chamber, said collar forming, together with the housing, an additional chamber on the side facing the inlet chamber.

It is necessary to provide the piston with a damping device aimed at damping dynamic forces that result from collision of the piston and the housing of the air-blasting cartridge at the instant of an air blast, as well as at returning the piston into the initial position, said damping device being located in the piston collar on the side facing the additional chamber.

It is desirable that the damping device should comprise a circular housing accommodating a damper with a bearing which is adapted to interact with the housing in the zone of the inlet chamber at the instant when the discharge chamber is being exhausted.

Such a construction arrangement provides for operating reliability and long service life of the damping device.

It is expedient that the additional chamber should communicate with the surrounding atmosphere, at the moment of exhausting the discharge chamber, through at least one open-end passage made in the housing close to the inlet chamber, a pressure relief valve being provided at the outlet of said passage.

This feature provides for a considerable reduction of the damping effect produced by the air in the additional chamber and protects the latter against soiling.

The herein-proposed air-blasting cartridge, according to the invention, is applicable for cleaning industrial pipelines used to transfer liquids supersaturated with solid suspensions, various pulps inclusive, and is operable within a wide range of compressed air pressures using automatically adjustable parameters of an air blast. The present air-blasting cartridge features simple construction reliable in operation. Besides, the construction of the herein-proposed air-blasting cartridge provides the maximally possible air-blasting force (i.e., that of compressed-air discharge) and its ability to self-propel along the surface being cleaned when cleaning pipelines.

dr

BRIEF DESCRIPTION OF THE DRAWING

Given below is a specific embodiment of an air-blasting cartridge to be considered with reference to the accompanying drawing, wherein a schematic longitudinal sectional view of the air-blasting cartridge is represented, according to the invention.

BEST MODE FOR CARRYING OUT THE INVENTION

The air-blasting cartridge comprises a housing 1 (as shown in the accompanying Drawing), which is subdivided, by a piston 2 arranged along a longitudinal axis of the piston 2, into an inlet chamber 3 and a discharge chamber 4. The in/let chamber 3 communicates with a source of compressed air (omitted in the Drawing) through holes 5 in an air-admission tube 6, which runs through an axial port of the piston 2 and establishes an annular gap 7 therewith. The inlet chamber 3 communicates with the discharge chamber 4 through the annular gap 7.

A collar 8 is provided on the piston 2 which forms, together with the housing 1, an additional chamber 9 on the side facing the inlet chamber 3.

The area of an end surface 10 of the piston 2 that faces the discharge chamber 4 is greater than the area of an end surface 11 thereof that faces the inlet chamber 3 but is smaller than the area of an end surface 12 of the collar 8 that faces the discharge chamber 4.

The piston 2 is provided with a damping device located on the collar 8 on the side facing the additional chamber 9.

The damping device comprises a circular housing 13 which is thread-fitted in the collar 8. The circular housing 13 accommodates a damper 14 with a bearing ring 15. The damper 14 is made from an elastic material, such as polyurethane.

At least one through-passage 16 is provided in the housing 1 within the zone of the inlet chamber 3. Four such through-passages 16 are provided in this particular embodiment of the air-blasting cartridge. A pressure relief valve is provided at the outlet of each of the through-passages 16, said valve comprising a closure 17 under which a ball 18 is fitted, which is forced against the exit port of the through-passage 16 by a spring 19.

Through-holes 20 arranged at an angle to the air-blasting cartridge axis are provided in the housing 1 within the zone of the discharge chamber 4, which ensure traversing of the cartridge in the course of operation.

A reducing union 21 is fitted in the end face of the housing 1 on the side of compressed air supply, for the air-blasting cartridge to communicate with the source of compresesed air (omitted in the Drawing). A ring-bolt 22 is provided on the reducing union 21 for holding the rope (omitted in the Drawing) with which the air-blasting cartrige is safe-guarded during operation and is withdrawn from the pipeline (omitted in the Drawing).

The air-blasting cartridge of the invention operates as follows.

Compressed air is fed from its source (omitted in the Drawing) alon a high-pressure conduit (omitted in the Drawing) and through the reducing union 21, the air admission tube 6 and the holes 5 therein to the inlet chamber 3, whence through the annular gap 7 compressed air flows into the discharge chamber 4. As a result, the force of the compressed-air pressure applied to the end surface 11 of the piston 2 urges the latter against the seat, thus shutting off the through-holes 20.

Since the end surface 10 of the piston 2 is greater than the end surface 11 thereof, the pressure force exerted upon the end surface 10 after the pressure in the discharge chamber 4 has reached the preset value, exceeds the pressure force applied to the end surface 11 by a value equal to the force friction between the piston 2 and the housing 1. As a result, the piston 2 starts traversing towards the inlet chamber 3. As soon as the piston 2 comes off the seat the compressed air pressure is applied to the end surface 12 of the collar 8 of the piston 2. Thus, the force of the compressed air pressure applied to the piston 2 from the side of the discharge chamber 4 rises drastically, whereby the piston 2 is urged to move practically at once towards the inlet chamber 3, thus opening instantaneously the through-holes 20 and letting compressed air to discharge from the discharge chamber 4 through the holes 20 into the surrounding atmosphere to produce an air blast.

The impact of the piston 2 against the housing 1 within the zone of the inlet chamber 3 is taken up by the damper 14 through the bearing ring 15. Thus, the damper 14 is caused to compress and accumulate potential energy, which is then transmitted to the piston 2 to return it to the initial position.

A low excess pressure is maintained in the additional chamber 9, accounted for by the hydraulic resistance of the pressure relief valves provided at the outlet of the through-passages 16.

Once the discharge chamber 4 has been exhausted, the compressed air pressure applied to the end surface 11 of the piston 2 and the elastic force of the damper 14 acting upon the latter causes the piston 2 to return to the initial position. Then the entire operating cycle is repeated.

It should be noted that the compressed air pressure in the inlet chamber 3 increases but slightly when the piston 2 travels towards said chamber and, once the piston 2 stops, drops quickly down to the value of the compressed air pressure in the aid admission tube 6. Besides, the lapse of time spent by the piston 2 to traverse towards the discharge chamber 4 for the through-holes 20 to shut off exceeds the period of time within which the piston 2 travels towards the inlet chamber 3 for the through-holes 20 to open. This can be explained by the fact that the piston 2 is moved for opening the holes 20 under the force of compressed air pressure exerted upon the end surface 12 of the collar 8 of the piston 2, whereas its traversing for shutting off the holes 20 is actuated by the force of the compressed air pressure applied to the end surface 11 of the piston 2, which is much smaller in area than the end surface 12. That is why the discharge chamber 4 has time enough to discharge nearly completely, which also adds to the operating efficiency of the air-blasting cartridge.

No loss of compressed air occurs in the air-blasting cartridge according to the invention, since there is not necessary to escape compressed air into the atmosphere for pressure reducing in the inlet chamber in order to actuate the air-blasting cartridge, which is the case in the prior-art cartridges.

A comparatively high rate of opening the through-holes enables one to provide a relatively high discharge velocity of compressed air from the discharge chamber 4 into the surrounding atmosphere and hence to attain generation of high-power shock waves.

INDUSTRIAL APPLICABILITY

BACKGROUND OF THE INVENTION

The present invention can find most utility when applied for cleaning industrial pipelines that are to transfer badly soiled liquids, various pulps inclusive, as well as for loosening cake settlings in settling basins and reservoirs of water-cooling towers, and for destructing various hard materials.

What we claim:

1. An air-blasting cartridge, comprising housing (1) subdivided, by a piston (2) arranged lengthwise a longitudinal axis thereof, into an inlet chamber (3) communicating with a source of compressed air through an air admission tube (6) which runs through an axial port of said piston (2), and a discharge chamber (4), communicating with the inlet chamber (3) through an annular gap (7) between said air admission tube (6) and said piston (2) and adapted to communicate with the surrounding atmosphere at the instant of its discharge characterized in that the area of the end surface (10) of said piston (2) that faces said discharge chamber (4) is greater than the area of the end surface (11) of said piston (2) that faces paid inlet chamber (3) but is smaller than the area of the end surface (12) of a collar (8) on said piston (2) that faces said discharge chamber (4), said collar forming, together with said housing (1), an additional chamber (9) on the side facing said inlet chamber (3).

2. An air-blasting cartridge as claimed in claim 1, characterized in that said piston (2) is provided with a damping device situated in said collar (8) on the side facing said additional chamber (9).

3. An air-blasting cartridge as claimed in claim 2, characterized in that said damping device comprises a circular housing (13) accommodating a damper (14) with a bearing ring (15) which is adapted to interact with said housing (1) within the zone of said inlet chamber (3) at the instant when said discharge chamber (3) is being discharged.

4. An air-blasting cartridge as claimed in claim 1, characterized in that said additional chamber (9) establishes communication, at the instant when said discharge chamber (4) is being discharged, with the surrounding atmosphere through at least one open-end passage (16) made in said housing (1) close to said inlet chamber (3), a pressure relief valve being provided at the outlet of said passage.

* * * * *